May 18, 1943.  E. E. SAWYER  2,319,267

INDIVIDUAL MULTILAYER FIBROUS RESIN-BEARING ARTICLE

Filed May 14, 1941

Inventor
Edward E. Sawyer
By Spear, Rawlings & Spear.
Attorneys.

Patented May 18, 1943

2,319,267

UNITED STATES PATENT OFFICE 2,319,267

INDIVIDUAL MULTILAYER FIBROUS RESIN-BEARING ARTICLE

Edward E. Sawyer, Waterville, Maine, assignor, by mesne assignments, to The Canal National Bank of Portland, Portland, Maine, a national banking association, as trustee Application May 14, 1941, Serial No. 393,368

2 Claims. (Cl. 229—2.5)

This invention relates to the manufacture of individual multilayer molded fibrous resin-bearing articles of dished shape, such as plates, trays, cups and other contoured shapes having either a raised rim or a concaved or hollow formation.

In my application Serial No. 221,112, filed July 25, 1938 (now Letters Patent No. 2,274,095, February 24, 1942), I disclosed a multilayer article in which the individual pre-forms or layers were die-molded from different aqueous fibrous pulp mixtures containing phenol-formaldehyde resins, dried, and finished under heat and mechanical pressure.

This method enabled articles to be produced at the minimum manufacturing expense, and the articles were of good serviceable quality and attractive appearance.

For certain types of molded articles, however, it is sometimes desirable that the finished article shall have properties difficult to obtain by die-molding the pre-forms from aqueous fibrous pulp mixtures containing water-insoluble phenol-formaldehyde resins. Among such properties are fast bright brilliant colors, pastel shades, and superior hardness, smoothness, and resistance to wear, abrasion, and the attack of water or chemical re-agents.

Accordingly one aspect of my present invention involves the economical production of articles having these and other desirable properties not obtainable with the method and materials disclosed in my prior application.

In achieving this result, I follow generally the method disclosed in said prior application as to the formation of the body or core layer, that is to say I preferably die mold the body or core layer from an aqueous fibrous pulp mixture containing a water-insoluble phenol-formaldehyde resin and dry said layer. Instead of likewise die-molding the surface layer or layers from a similar aqueous resin-fibre mixture, I die mold said surface layer or layers from an aqueous fibrous pulp mixture which contains no resin at all. I next dry said surface layer or layers and then, by any suitable impregnation process, I impregnate the dried surface layer to the desired degree with a resin in solution. After drying the resin-impregnated surface layer, I assemble it with the dried body or core layer, and subject the nested layers to heat and pressure to cure the resin and compact the article.

Although many resins may be used to impregnate the surface layer, I prefer to use a suitably colored water-soluble resin of the urea formaldehyde type, or I may color the surface layer before impregnating it with the resin. Where this resin, or other water-soluble resins of analogous type are used, the final article exhibits as to its surface layer or layers a fast brilliant coloring, a pastel shade, or, if no color has been added, a colorless transparent surface, and also has the requisite hardness, smoothness and resistance to wear, abrasion and the attack of water or chemical reagents.

While it is possible to add such water soluble resins to the beater furnish, as described in my prior application, such procedure is not recommended for reasons as follows: In order to obtain proper retention of the resin in the molded article, it would be necessary to use a saturated water solution of the resin. This saturated solution would require extremely large quantities of the expensive resin to effect complete saturation of the water required in the molding process, and careful analytical control would be necessary in order to maintain the proper degree of saturation of the water so that a uniform retention of the resin in the pre-form would always be obtained. Moreover, on account of contamination of the water by dirt and other foreign matter incident to a process of this nature, it would be necessary to change the water frequently in order to insure cleanliness of the molded article, as well as whenever a differently colored molded article was made.

Another aspect of my invention involves the economical production of articles containing water-insoluble resins of the phenol-formaldehyde type which are capable of being dissolved in a solvent and then incorporated in the fibrous surface layer by any suitable impregnation process.

Speaking generally, certain types of water-insoluble phenol-formaldehyde resins are unsuitable for use in a beater furnish for reasons as follows: They become soft and gummy when mixed with water and lump up into large masses which cannot be uniformly dispersed throughout the fibres of the pre-form. These large non-uniformly dispersed masses of resin ruin the appearance of the cured article as well as giving an article of non-uniform structure.

I have found that these water-insoluble phenol-formaldehyde resins may be incorporated and distributed throughout the fibrous mass of the pre-form if they are dissolved in a suitable solvent and afterwards incorporated in the fibrous pre-form by the same process used in impregnating the fibrous pre-forms with water soluble resins.

I do not intend, however, to limit myself to those water-insoluble phenol-formaldehyde resins which are impracticable to use in a beater furnish, but may use any and all phenol-formaldehyde resins which are capable of being dissolved in a solvent.

I am aware that molded pulp articles have been given a surface coating of practically pure resin in order to effect certain desired properties. In general, however, this method is unsatisfactory if a coating of appreciable thickness is desired, due to the fact that the difference in the coefficient of expansion of the resin and the fibre base causes cracking, chipping and peeling of the resin coated surface, and also warping of the article to take place.

These defects cannot occur in my article because the resin is uniformly distributed throughout the surface layer and is reinforced by the fibres of said layer, so that any tendency of the resin to crack, chip, peel, or warp is counteracted by the fibres of said layer.

Another advantage of my article is that I may mold my fibrous surface layers and before impregnation store them for a considerable period of time without danger that they will deteriorate. Thereafter, at any desired time, they may be impregnated with the desired type and quantity of resin.

Figure 1:
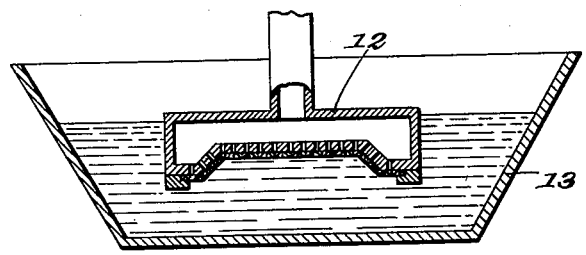
Fig. 1 is a section showing a foraminous forming die immersed in a tank containing an aqueous fibrous pulp mixture and synthetic resin for the suction formation of a body or core layer.

I have indicated at 10 and 11, respectively, the surface and body or core layers. Both layers are suction or pressure formed by immersing a foraminous forming die or dies 12 in a tank or tanks 13 containing aqueous pulp mixtures composed predominantly of cellulosic or other fibrous material, either with or without the addition of organic or inorganic fillers and coloring matter.

In the case of the body or core layer 11, the aqueous pulp mixture contains an uncured water-insoluble synthetic resin of the thermo-setting or thermo-plastic type in powdered or other suitable form. Preferably, but not necessarily, such resin is of the phenol-formaldehyde type.

In the case of the surface layer 10, the aqueous pulp mixture contains no resin. The forming die or dies on which the respective layers 10 and 11 are formed correspond substantially in size and shape to the size and shape of the required final article, and the formed layers substantially nest or fit within each other when removed from said die or dies and dried.

The proportion of fibre to resin in the body layer 11 may vary according to the properties wanted in the final article. In general, the amount of fibres, by dry weight, exceeds that of the resin so as to afford ample mechanical strength.

After the layers 10 and 11 have been formed to the required thickness on the forming die or dies, they are drained of their surplus water content and dried. In the case of the body or core layer, the drying is carried out at a temperature sufficiently low so that the chemical composition of the resin remains substantially unchanged.

Figure 3:
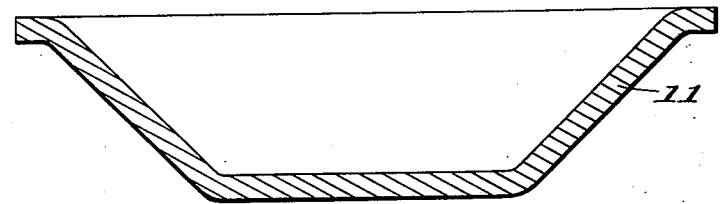
Fig. 3 is a section through the body or core layer after it has been removed from its forming die and dried in readiness for consolidation with the surface layer to form a multilayer article.
Figure 4:
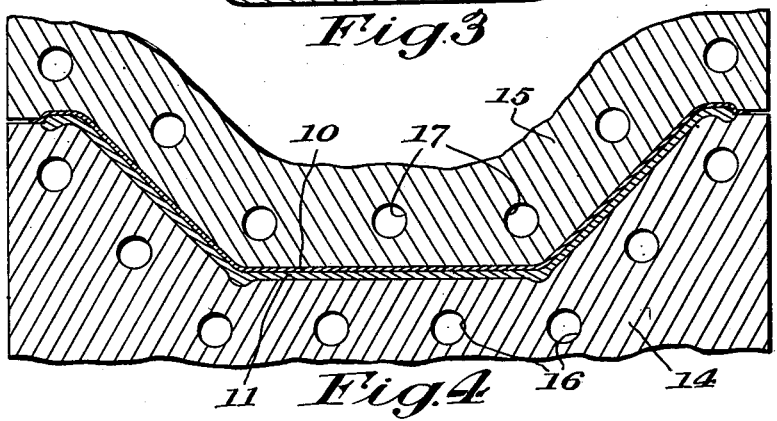
Fig. 4 is a section through a pair of complemental imperforate finishing dies showing the preformed body layer of Fig. 3 and the impregnated surface layer of Fig. 2 superimposed upon one another within said dies for compacting, finishing and bonding under heat and mechanical pressure.

In this condition, the dried body or core layer (see Fig. 3) is ready for consolidation with the surface layer. However, before the consolidating and finishing step can be performed, it is necessary to impregnate the surface layer with a suitable resin. This may be done by dissolving the resin in a suitable solvent or solvents and immersing the fibrous surface layer therein, or by spraying the resin-solution on the pre-form until it contains the proper amount of resin. The degree of impregnation will depend upon the qualities desired in the finished article but in any case is sufficient to cause the resin to be distributed substantially uniformly throughout the fibrous structure of said layer.

Figure 2:
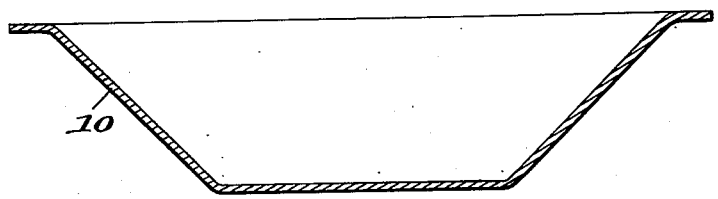
Fig. 2 is a section through a fibrous surface layer which has been die-molded from an aqueous fibrous pulp mixture containing no resin, dried, and thereafter impregnated with a resin in solution, and dried.
Figure 5:
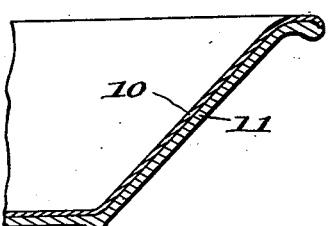
Fig. 5 is an enlarged fragmentary cross section through the finished article of Fig. 4.

When impregnated to the desired extent and dried to remove residual solvent at a temperature insufficient to substantially change the chemical composition of the resin, said layer (see Fig. 2) is in condition to be united to the body or core layer to form the composite article shown in Fig. 5.

In the consolidating and finishing operation, the dried preforms 10 and 11 are nested within one another in the desired order of arrangement between a pair of imperforate complemental finishing dies 14 and 15 of a size and shape corresponding substantially to that required for the finished article, this being substantially the size and shape of the die or dies on which said layers were formed.

The finishing dies are closed on the preforms under sufficient pressure to compact and consolidate them as a single article. They are also supplied with sufficient heat to set or cure the resin of the several layers substantially uniformly in and around the framework of fibers in said layers. Either or both of the finishing dies may be heated in any desired manner as by means of the steam passage 16 and 17 in the die bodies.

The compacting pressure exerted by the finishing dies is sufficient to reduce the article layers to the desired thickness and density, but does not materially distort, break, fold or otherwise rearrange the fibers from their original preformed positions.

During the compacting and finishing operation, the surface of the surface layer which lies adjacent the finishing die 15 is given a smooth or glossy finish, and by embossing on said die a pattern or other decorative design, such design is reproduced in the article surface. Or said die may have grooves or other indentations therein which form strengthening ribs in the finished article. As a result of the compacting and finishing operation the resin of the surface layer is forced into intimate interlocking contact with the surface fibres of the body or core layer, and with the resin of said body layer, forms a strong bond between the contacting surfaces of said layers, which bond is substantially uniform throughout the entire area of surface contact of the layers.

The cured resin of the surface layer likewise gives a hard, smooth, enamel-like finish to the exposed surface of the article which effectively resists penetration of moisture, alcohol, grease, oils and mild acids and alkalies.

Figure 6:
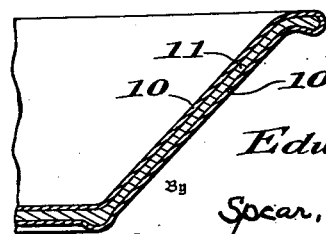
Fig. 6 is a view similar to Fig. 5 but showing a three-layer article composed of a central or core layer and top and bottom surface layers.

In the three layer article of Fig. 6, the central layer 11 is a core layer covered at top and bottom by surface layers 10—10.

Obviously for articles of extreme bulk the body layer may be molded as several sections rather than as an excessively thick single section. Likewise for some purposes it may be desirable to arrange a thin, rich in resin layer, corresponding to the surface layer 10 between several body layers corresponding to the body layer 11 to ensure proper bonding of the several body layers. In any case, however, the proportion of resin to fibre in the surface layer is appreciably greater than in the body layer.

Various other modifications in method and materials may obviously be resorted to if within the scope of the appended claims.

What I therefore claim and desire to secure by Letters Patent is:

1. An individual multilayer fibrous article of dished shape, comprising a plurality of superimposed pre-formed resin bearing fibrous layers of complemental size and shape compacted and finished under heat and pressure, one of said layers being a body layer die-molded from an aqueous pulp mixture containing a substantial amount of fibre and a water-insoluble resin distributed uniformly throughout said layer, and another of said layers being a finishing layer die-molded from an aqueous fibrous pulp mixture, dried, and thereafter impregnated with a resin dissolved in a solvent, and dried, the resin in each layer being distributed substantially uniformly throughout said layer, and the proportionate amount of resin to fibre in said finishing layer being appreciably greater than the proportionate amount of resin to fibre in said body layer, the fibrous structure of said layers being substantially unchanged, except for compacting, from their original die-molded shape and presenting an article substantially free from defects caused by wrinkles, folds or breaks in the fibrous structure, and the cured resin in the finishing layer giving a hard, smooth, enamel-like finish to the exposed surface of said layer and with the cured resin in the body layer furnishing a bond between the contacting surfaces of said layers.

2. An individual multilayer fibrous article of dished shape, comprising a plurality of superimposed pre-formed resin bearing fibrous layers of complemental size and shape, compacted and finished under heat and pressure, one of said layers being a core layer die-molded from an aqueous pulp mixture containing a substantial amount of fibre and a water-insoluble resin distributed substantially uniformly throughout said layer, and two other layers being finishing layers each die-molded from an aqueous fibrous pulp mixture, dried, and thereafter impregnated with a resin dissolved in a solvent, and dried, the resin in each layer being distributed substantially uniformly throughout said layer, and the proportionate amount of resin to fibre in each finishing layer being appreciably greater than the proportionate amount of resin to fibre in said core layer, the fibrous structure of said layers being substantially unchanged, except for compacting from their original die-molded shape and presenting an article substantially free from defects caused by wrinkles, folds or breaks in its structure, and the cured resin of the finishing layers giving a hard, smooth, enamel-like finish to the exposed surfaces of said layers and with the cured resin of said core layer furnishing a bond between the contacting surfaces of said layers.

EDWARD E. SAWYER.